Feb. 23, 1926.

I. P. FREIBURGER

RAKE

Filed Sept. 2, 1925

INVENTOR.
I. P. Freiburger
BY
ATTORNEY.

Patented Feb. 23, 1926.

1,573,819

UNITED STATES PATENT OFFICE.

IGNATIUS P. FREIBURGER, OF FORT WAYNE, INDIANA.

RAKE.

Application filed September 2, 1925. Serial No. 54,017.

*To all whom it may concern:*

Be it known that I, IGNATIUS P. FREIBURGER, a citizen of the United States, residing at Fort Wayne, in the county of Allen and State of Indiana, have invented new and useful Improvements in Rakes, of which the following is a specification.

The invention relates to rakes for use primarily by pavement workers. In the laying of pavements the general practice followed is to spread the materials by a rake. In many instances it is desirable to rake the materials from the side of the pavement so that the workmen will not step on the material and injure the surface. When the materials are heavy it is laborious for one workman to rake it alone.

The object of my invention is to provide a hand rake with means by which two men may operate it from opposite sides and at various angles.

The invention consists in a rake having two handles, one of which is fixed and the other pivoted for universal movement.

Figure 1:
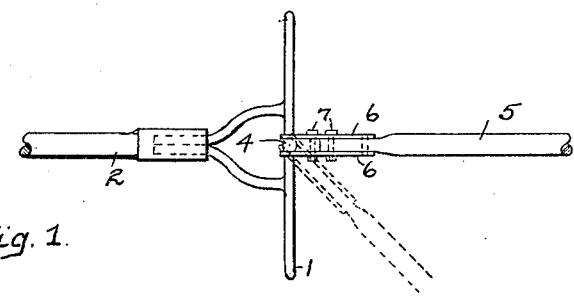
Figure 2:
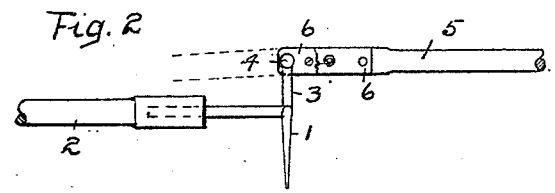
Figure 3:
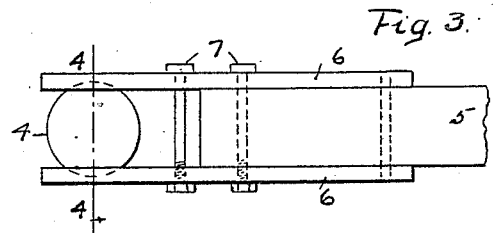
Figure 4:
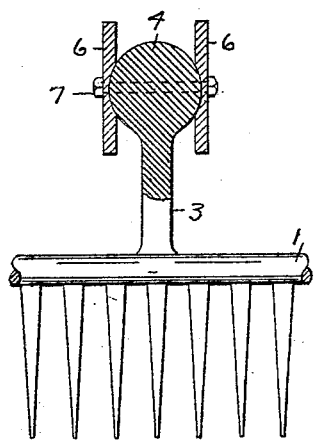

An embodiment of the invention is illustrated in the accompanying drawings in which, Figure 1 is a plan view of the rake; Fig. 2 a side elevational view of the same; Fig. 3 a plan view of the mounting of the pivoted handle and Fig. 4 a cross-section on line 4—4 of Fig. 3.

In the illustrative embodiment of the invention, 1 represents a toothed head of suitable form having the handle 2 rigidly secured thereto. A post 3 projects upwardly from the head 1 and a ball 4 is disposed on the upper end of the post and preferably integral therewith. The handle 5 is mounted on the ball 4 by two bars 6 that are secured to opposite sides of the handle by the bolts or rivets 7. The bars project beyond the end of the handle and a cavity is formed in the inner face of the projecting end of each bar for the reception of the ball, the bolts or rivets clamping the bars on the ball to prevent separation therefrom but permitting the universal movement of the handle on the ball. The auxiliary handle 5 may be swung in any direction on the rake head—it may be in line with the handle 2 or at any angle thereto. The operator holding the handle 5 in his hand, therefore, may pull or push on the rake head at various angles to the longitudinal axis of the fixed handle and thereby permit him to assume various positions on the roadway and cooperate with the other workman in moving the rake back and forth.

For transporting the rake or for use by one workman the pivoted handle may be swung on its pivot into engagement with the fixed handle, the broken lines in Fig. 2 indicating such position of the pivoted handle.

Any suitable form of socketed member mounted on the ball 4 will suffice for pivotally attaching the handle 5 to the rake head.

It is apparent that the operation of raking stones and materials on a highway is greatly facilitated by my invention, much time being saved by the use of my rake.

What I claim is:

1. A rake consisting of a head member, a handle rigidly secured to the head and a second handle pivoted to the head for universal movement thereon.

2. A rake consisting of a head member, a handle secured to the head, and a second handle having a ball and socket connection to the head.

3. A rake consisting of a head member, a handle rigidly secured to the head, a post projecting upwardly from the head, a ball at the upper end of the post and a handle mounted on the ball for universal movement thereon.

4. A rake consisting of a head member, a handle rigidly secured to the head, a post projecting upwardly from the head, a ball at the upper end of the post, a second handle, and means revolubly mounted on the ball and secured to the handle.

In witness whereof I have hereunto set my hand this 27th day of August, 1925.

IGNATIUS P. FREIBURGER.